United States Patent [19]
Adams

[11] Patent Number: 5,104,151
[45] Date of Patent: Apr. 14, 1992

[54] COUPLER APPARATUS FOR CONNECTING A CONDUIT TO AN EQUIPMENT OPENING HAVING DAMAGED THREADS

[76] Inventor: Don L. Adams, P.O. Drawer T, Tulia, Tex. 79088

[21] Appl. No.: 700,470

[22] Filed: May 15, 1991

[51] Int. Cl.⁵ ............................. F16L 55/18
[52] U.S. Cl. .............................. 285/16; 285/39; 285/175; 285/338; 285/357
[58] Field of Search .............. 28/15, 16, 39, 196, 28/201, 346, 355, 357, 338, 175

[56] References Cited

U.S. PATENT DOCUMENTS

| | | | |
|---|---|---|---|
| 2,543,954 | 3/1951 | Barber | 285/39 |
| 2,677,557 | 5/1954 | Worel | 285/15 |
| 2,721,089 | 10/1955 | Shames | 285/338 X |
| 2,766,054 | 10/1956 | Everhart . | |
| 2,872,963 | 2/1959 | Boyer | 285/39 X |
| 3,058,760 | 10/1962 | Baukowski | 285/196 |
| 3,194,592 | 7/1965 | Boughton . | |
| 3,476,414 | 11/1969 | Condrac . | |
| 3,578,360 | 5/1971 | Eliot | 285/338 X |
| 3,768,839 | 10/1973 | Thompson | 285/338 X |
| 3,863,963 | 2/1975 | Hershey . | |
| 4,003,835 | 1/1977 | Johnson | 285/338 X |
| 4,434,816 | 3/1984 | DiGiovanni et al. | 285/15 X |
| 4,481,930 | 11/1989 | Chadwick | 285/15 X |
| 4,630,850 | 12/1986 | Saka . | |

*Primary Examiner*—Michael F. Trettel
*Attorney, Agent, or Firm*—Daniel V. Thompson

[57] ABSTRACT

Apparatus for connecting a conduit to an equipment opening having damaged female threads includes a body, an annular packing ring and a packing follower. The packing ring is formed of an extrudable, non-resilient packing material. The body and the packing follower are threaded to engage the female threads of the equipment opening. The packing ring is compressed and extruded into the damaged threads by relative rotation of the body and packing follower.

6 Claims, 3 Drawing Sheets

1

COUPLER APPARATUS FOR CONNECTING A CONDUIT TO AN EQUIPMENT OPENING HAVING DAMAGED THREADS

TECHNICAL FIELD

This invention relates to conduit couplings, and more particularly to a coupling for connecting a conduit to an equipment opening having damaged threads.

BACKGROUND OF THE INVENTION

A coupling between a conduit and an equipment opening typically involves a tubing connection to the conduit on one end and a self-sealing male pipe thread on the other end. The male pipe thread is designed to be engaged with a female pipe thread on the equipment. Unfortunately, it is all too common for the female threads in the equipment opening to become damaged, such that a sealed connection is no longer possible.

U.S. Pat. No. 4,003,835 discloses a fitting for use as a replacement in a carburetor that has substantially entirely stripped threads in the fuel inlet. A smooth, cylindrical, resilient member is expanded into engagement with the stripped thread surface. The fitting in the Johnson Patent is not usable where a substantial amount of the damaged female threads is still in place, as a resilient seal member would not adequately seal against existing threads. In addition, no means is provided to hold the inner member for relative rotation with respect to the outer fitting. The Johnson fitting is useable only in low pressure applications, such as the carburetor fuel line application disclosed (<10 p.s.i.).

Thus, a need presently exist for a coupling member that is usable in high pressure application and/or where a substantial amount of the female threads remain in the equipment opening but a metal-to-metal pipe thread seal is no longer possible.

SUMMARY OF THE INVENTION

The present invention is a coupler apparatus for connecting a conduit to an equipment opening, where the equipment opening has damaged female threads. The apparatus includes a body, an extrudable, nonresilient, annular packing ring, and a packing follower. The body and the packing follower include threaded outer surfaces with male threads formed thereon and sized for engagement with the damaged female threads of the equipment opening. These male threads are engaged with the damaged female threads of the equipment opening, and then the body and packing follower are rotated relative one another to extrude the packing ring into the threads to provide a high pressure seal.

BRIEF DESCRIPTION OF THE DRAWINGS

A more complete understanding of the invention and its advantages will be apparent from the Detailed Description taken in conjunction with the accompanying Drawings in which.

DETAILED DESCRIPTION OF THE PREFERRED EMBODIMENT

Figure 1:
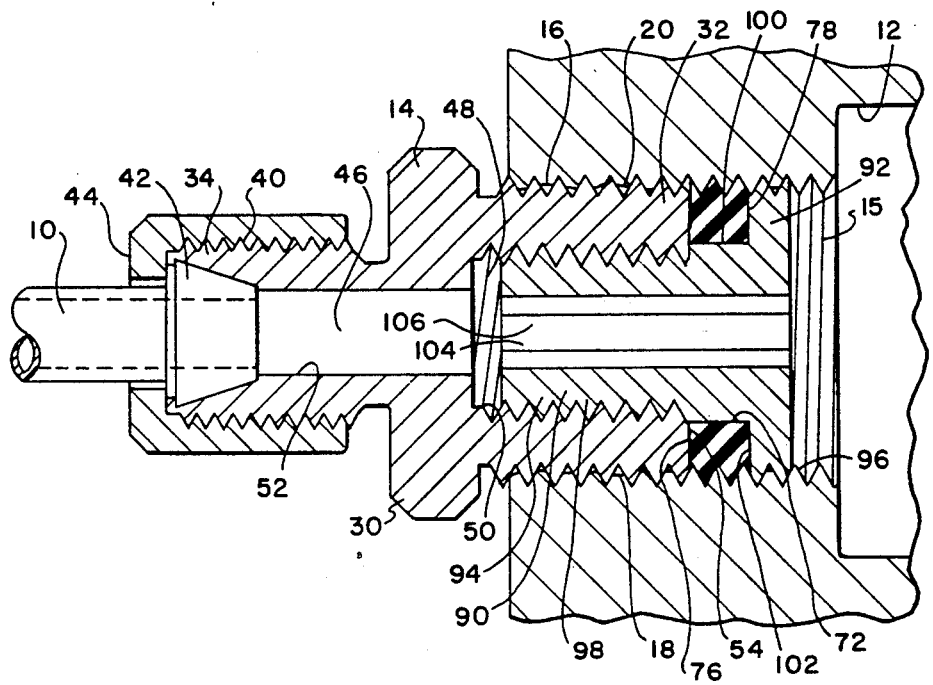
FIG. 1 is a partially broken away side view of apparatus constructed in accordance with the present invention.
Figure 2:
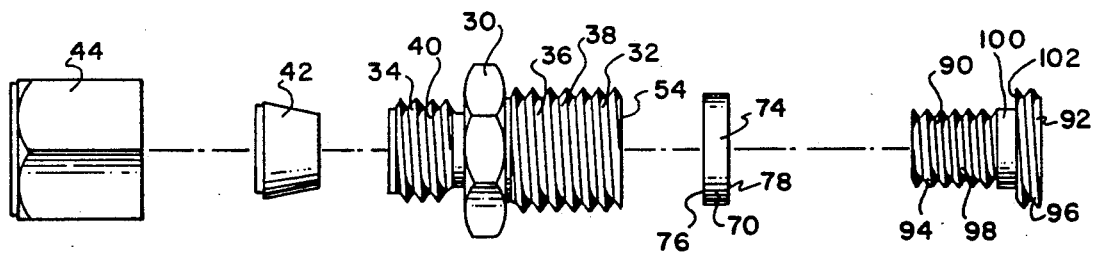
FIG. 2 is a exploded view of the apparatus as FIG. 1.

Referring initially to FIGS. 1 and 2, where like and corresponding numerals indicate like and corresponding elements, a conduit 10 is connected to an equipment opening 12 by way of a coupling apparatus 14. As shown in FIG. 1, equipment opening 12 has female threads 15, some of which are damaged as indicated by reference numerals 16, 18 and 20.

Apparatus 14 includes a body 30 having first and second ends 32 and 34, respectively. Male threads 36 are formed on an outer surface 38 of first end 32. Threads 36 are sized for engagement with the damaged female threads 15 of equipment opening 12. Means are provided on the second end 34 of the body for connection to conduit 10, the means for connection including threads 40, ferrule 42 and nut 44.

Body 30 has inner surfaces forming an internal passageway 46 open at body 30's first and second ends 32 and 34, respectively. Female threads 48 are formed on inner surface 50 of first end 32. Threads 48 have the same pitch as male threads 36 on surface 38 of the first end 32 of body 30. Inner surface 52 of second end 34 is smooth and cylindrical. First end 32 of body 30 includes an annular, planar, end wall 54 spanning between the outer and inner threaded surfaces 38 and 50, respectively, of the first end.

An extrudable, non-resilient, annular packing ring 70 has inner and outer cylindrical surfaces 72 and 74, respectively. It should be noted that FIG. 1 shows packing ring 70 in its final, extruded condition, wherein outer cylindrical surface 74 has adopted the shape of the female threads 15. Packing ring 70 has first and second annular, planar, end surfaces 76 and 78, respectively. Outer cylindrical surface 74 is sized to closely pass through female threads 15 of equipment opening 12. First end surface 76 contacts end wall 54 of the body's first end 32. First end surface 76 is sized substantially the same as body end wall 54, prior to extrusion.

A packing follower 90 is provided for extruding packing ring 70 into the damaged female threads 15 of the equipment 94, respectively. First end 92 preferably has male threads 96 formed thereon and sized for engagement with the damaged female threads 15 of equipment opening 12. Second end 94 has male threads 98 formed thereon and engaged with the female threads 48 of body first end inner surface 50.

Packing follower 90 further includes a smooth, cylindrical, coaxial wall 100 inward of and adjacent to second end male threads 98. Coaxial wall 100 contacts inner surface 72 of packing ring 70 and is sized substantially the same as inner surface 72. Packing follower 70 further includes an annular, planar, perpendicular wall 102 spanning between coaxial wall 100 and the first end male threads 96. Perpendicular wall 102 contacts the second end surface 78 of packing ring 70. Perpendicular wall 102 is sized substantially the same as body end wall 54 and first and second end surfaces 76 and 78, respectively, of packing ring 70.

Packing follower 90 further includes inner surfaces 104 forming an internal passageway 106. Preferably, inner surfaces 104 form a hexagonal inner cross-section for engagement with a predetermined hexagonal wrench. Inner surfaces 106 and inner surface 52 are sized, constructed and arranged to permit insertion and rotation of the wrench therethrough Body first end male threads 36 and packing follower first end male threads 96 are constructed and arranged such that they may be threadedly engaged with the damaged female threads 15 of equipment opening 12 a selected distance within equipment opening 12. Torque application means, preferably the wrench and hexagonal inner surfaces 104, are provided for causing relative rotation between body 30 and packing follower 90. This causes packing ring 70 to be compressed by body end wall 54, packing follower coaxial wall 100 and packing follower perpendicular wall 102 and extruded into sealing engagement with the damaged female threads 15 of equipment opening 12.

In operation, this invention can be used to salvage equipment that has been "ruined" by pipe thread galling or to avoid galling of pipe threads on new equipment. As shown, body 30 is similar to a conventional male pipe thread X tubing coupler, but incorporates a precision packing ring to relieve the pipe threads from the difficult task of accomplishing a metal-to-metal seal. The invention retains the convenience and strength of conventional male tubing couplings, and is compatible with installation and service procedures used on the conventional coupling. Nut 44, ferrule 42 and body 30 are of the same design and tolerances of male connectors commonly used in industry, except threads 36 are shortened one thread from the conventional coupling and the inside surface 50 is machined and threaded to receive packing follower 90. Packing ring 70 and packing follower 90 have no counterparts in conventional coupling technology.

As shown in FIG. 1, packing ring 70 is extruded under pressure into the damaged threads to form a seal. Packing ring 70 is captive between body 30 and packing follower 90 and the equipment threads 15. Since, by definition, pipe threads are close-fitting, a very effective packing gland-like structure develops with no extrusion path through the threads. Consequently, very high packing seal pressures can be successfully sustained, even with free flowing packings available such as GRAFOIL TM. Utilization of (1) outer surface male threads on the packing follower and the body, in combination with (2) an extrudable packing, is a critical feature of the invention, which permits high pressure sealing and a vast improvement over the low pressure device disclosed in the Johnson Patent No. 4,003,835.

Figure 3:
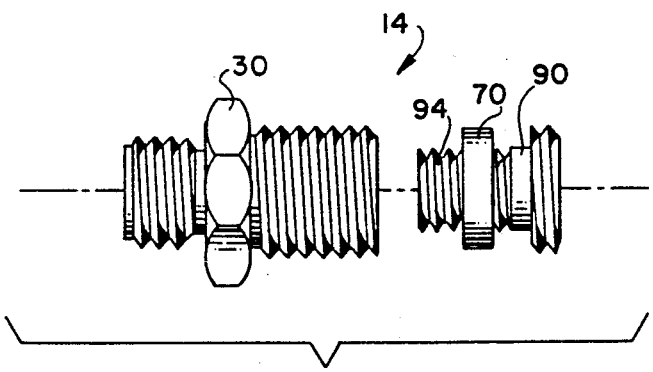
FIGS. 3-7 illustrate installation of the apparatus into an equipment opening.

Referring now to FIGS. 3–7, the method of installing the apparatus 14 of the invention first includes the step of slipping preformed packing ring 70 over the second end 94 of packing follower 90, as shown in FIG. 3. Packing ring 70 is preferably constructed in either TEFLON TM or GRAFOIL TM. Packing ring 70 is a simple inexpensive part that is easily replaced if it cannot be reused.

Figure 4:
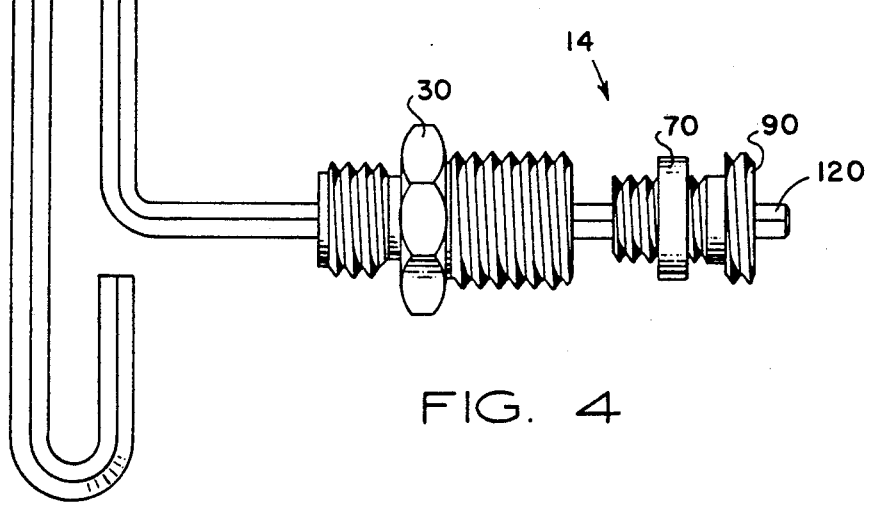
Figure 5:
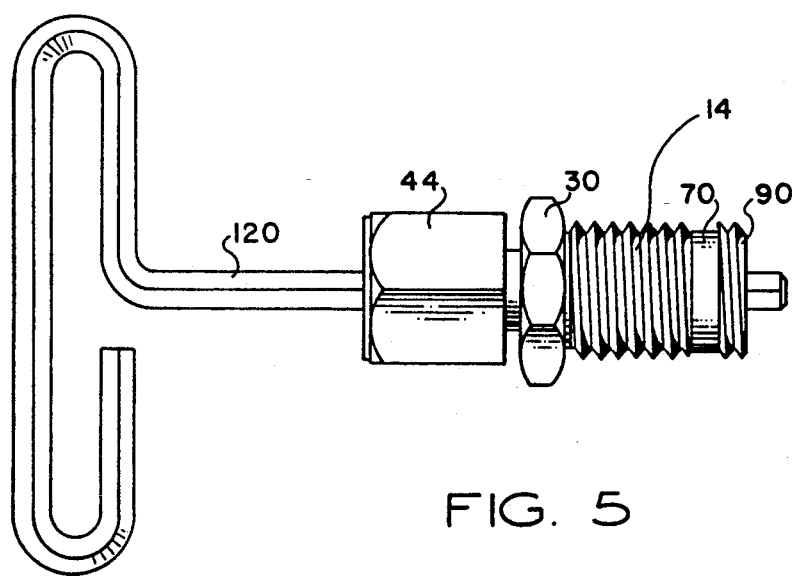
Figure 7:
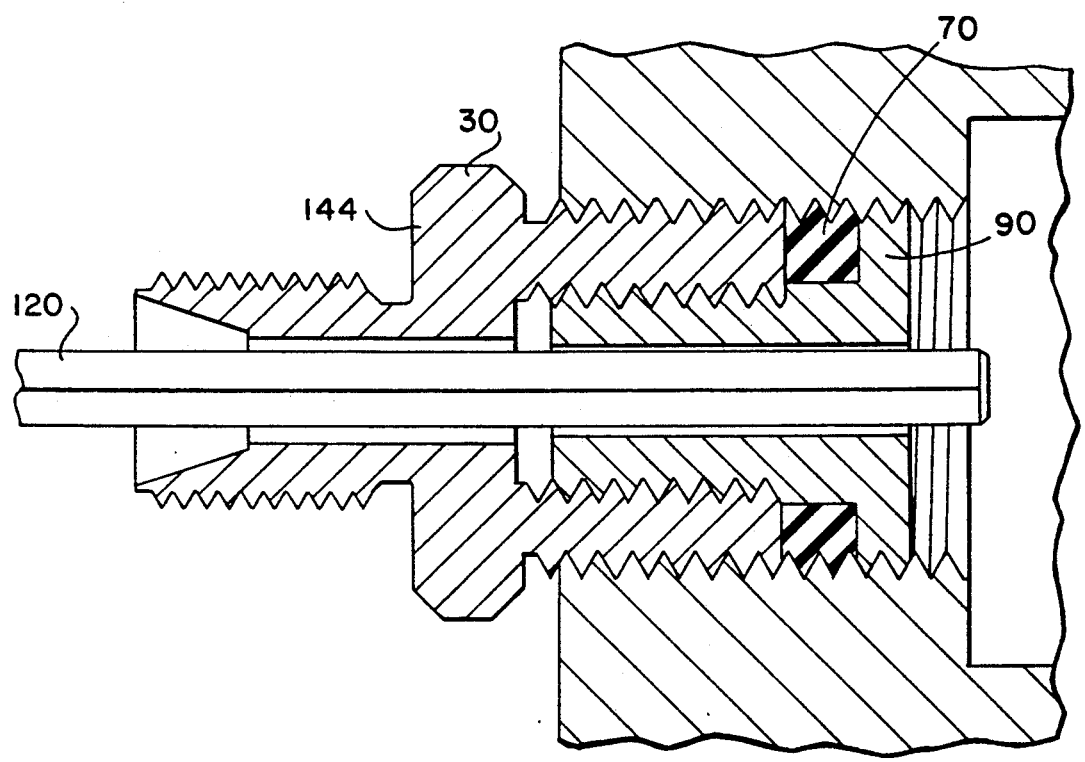

FIG. 4 illustrates a standard hex allen wrench 120 installed through the internal passageway 46 of adapter body 30 and into passageway 106 of packing follower 90. Internal passageway 106 is machined to fit wrench 120. However, internal passageway 46 of body 30 is larger than hex wrench 120, so wrench 120 turns freely relative to body 30. Wrench 120 may be used to install or to remove packing follower 90, as shown in FIG. 5, as well as to tighten packing ring 70 after the apparatus 14 is installed in the equipment opening 12, as shown in FIG. 7.

If the coupling of the present invention is to be used on damaged threads, it is preferable to run a good tap of the appropriate size into threads 15 before installing apparatus 14. This is to remove metal that has been displaced out into the thread path of the incoming apparatus 14. So torn threads will probably still be visible.

Figure 6:
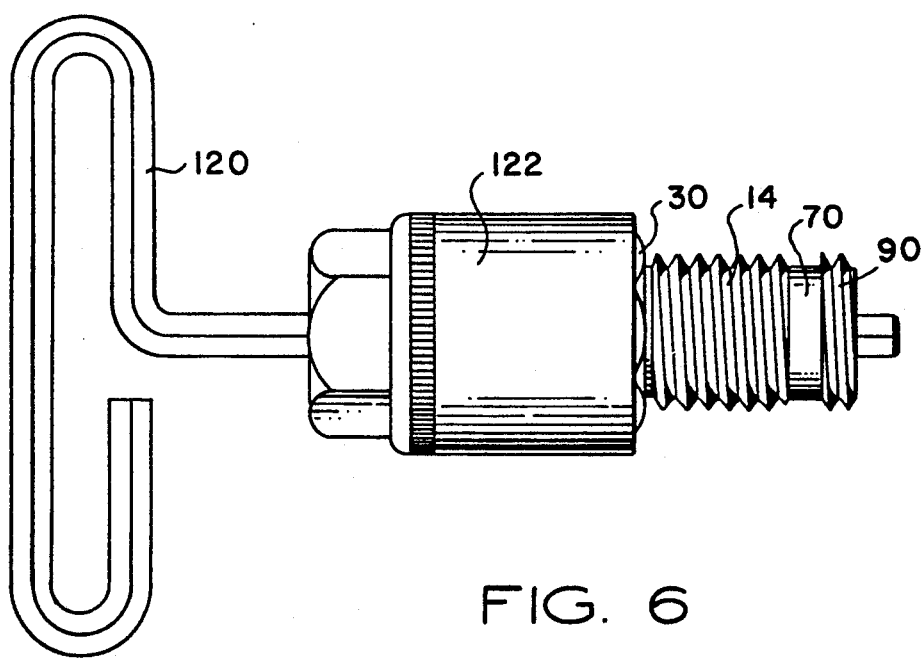

FIG. 6 illustrates the apparatus 14 ready for installation, with the addition of a socket 122 on body 30. A standard open end wrench in lieu of socket 122 may also be used. Prior to installation, preferably the threads are lubricated with teflon paste or an equivalent form of grease. Wrench 120 and socket 122 are used to snugly advance packing follower 90 into coupler 30, to slightly compress packing ring 70 prior to installation. Apparatus 14 is then screwed into equipment opening 12 with about half the torque normally used on same size conventional male coupler. Typically, about three threads will remain outside equipment opening 12 after apparatus 14 has been properly inserted. Socket 120 is used then held with a wrench, while packing 70 is compressed by turning allen hex wrench 122 counter-clockwise. Typically, approximately 175 in.-lbs. is required to fully tighten packing ring 70, which preferably is about the amount of torque an average person can apply to wrench 120 with one hand. A final step in installation is to firmly hold allen wrench 120 stationary to keep it from turning, and finish tightening body 30 by turning socket 122 slightly. It has been found that 200 in.-lbs. torque on socket 122 will produce over 8,000 p.s.i. packing pressure, so it is not necessary to overtighten the apparatus of the present invention. After wrench 120 and socket 122 are removed from the installed apparatus, conduit 10 may be connected as usual, as shown in FIG. 1.

Whereas the present invention has been described with respect to a specific embodiment thereof, it will be understood that various changes and modifications will be suggested to one skilled in the art, and it is intended to encompass such changes and modifications as fall within the scope of the appended claims. For example, the threaded connection between body 30 and packing follower 90 may be omitted, with just a slip fit in between. Then the male threads on the components would be relied upon to compress the packing. Preferably, however, the invention is used as shown in order to prevent galling problems.

What is claimed is:

1. Apparatus for connecting a conduit to an equipment opening, the equipment opening having damaged female threads, the apparatus comprising:

a body having first and second ends, with male threads formed on an outer surface of the first end and sized for engagement with the damaged female threads of the equipment opening, the male threads having a pitch, and means on the second end for connection to the conduit;

the body having inner surfaces forming an internal passageway open at the body's first and second ends;

the first end of the body including annular, planar, end wall spanning between the outer threaded surface thereof an the inner surface open at the first end;

an extrudable, non-resilient, annular packing ring having inner and outer cylindrical surfaces and first and second annular, planar, end surfaces, the outer cylindrical surface being sized to closely pass through the female threads of the equipment opening, and the first end surface contacting the end wall of the body's first end, and the first end surface being sized substantially the same as the body end wall;

a packing follower having first and second ends, the first end having an outer surface with male threads formed thereon and sized for engagement with the damaged female threads of the equipment opening, and the second end engaged with the body first end;

the packing follower further including a coaxial wall intermediate the first and second ends contacting the inner surface of the packing ring, and the packing follower further including an annular, planar, perpendicular wall spanning between the coaxial wall and the first end outer surface, the perpendicular wall contacting the second end surface of the packing ring, and the perpendicular wall being sized substantially the same as the body end wall and the first and second end surfaces of the packing ring;

the packing follower further having inner surfaces forming an internal passageway open at the packing follower's first and second ends;

torque application means for causing relative rotation between the body and packing follower;

said body first end male threads and packing follower first end male threads being constructed and arranged such that they may be threadedly engaged with the damaged female threads of the equipment opening a selected distance within the equipment opening, whereupon relative rotation between the body and packing follower caused by the torque application means causes the packing ring to be compressed by the body end wall and packing follower coaxial and perpendicular walls and extruded into sealing engagement with the damaged female threads of the equipment opening.

2. The apparatus of claim 1 wherein said body first end and packing follower second end are treadedly engaged, with female threads formed on an inner surface of the body first end having the same pitch as the male threads on the body first end outer surface, and the packing follower second end having male threads formed thereon and engaged with the female threads of the body first end inner surface.

3. The apparatus of claim 2 with the packing follower coaxial wall being smooth and cylindrical, the coaxial wall being located inward of and adjacent to said second end male threads, and the coaxial wall being sized substantially the same as the inner surface of the packing ring.

4. The apparatus of claim 1 with an inner surface of the body second end being smooth and cylindrical.

5. The apparatus of claim 1 wherein the torque application means includes the packing follower inner surfaces forming a hexagonal cross-section for engagement with a predetermined hexagonal wrench, and with the inner surfaces of the body internal passage way being sized, constructed and arranged to permit application and rotation of the wrench therethrough.

6. Apparatus for connecting a conduit to an equipment opening, the equipment opening having damaged female threads, the apparatus comprising:

a body having first and second ends, with male threads formed on an outer surface of the first end and sized for engagement with the damaged female threads of the equipment opening, the male threads having a pitch, and means on the second end for connection to the conduit;

the body having inner surfaces forming an internal passageway open at the body's first and second ends, with female threads formed on an inner surface of the first end having the same pitch as the male threads on the body first end outer surface, and with an inner surface of the second end being smooth and cylindrical;

the first end of the body including an annular, planar, end wall spanning between the outer and inner threaded surfaces of the first end;

an extrudable, non-resilient, annular packing ring having inner and outer cylindrical surfaces and first and second annular, planar, end surfaces, the outer cylindrical surface being sized to closely pass through the female threads of the equipment opening, and the first end surface contacting the end wall of the body's first end, and the first end surface being sized substantially the same as the body end wall;

a packing follower for extruding the packing ring into the damaged female threads of the equipment opening, the packing follower having first and second ends, the first end having male threads formed thereon and sized for engagement with the damaged female threads of the equipment opening, the second end having male threads formed thereon and engaged with the female threads of the body first end inner surface;

the packing follower further including a smooth, cylindrical, coaxial wall inward of and adjacent to said second end male threads, the coaxial wall contacting the inner surface of the packing ring and being sized substantially the same as the inner surface of the packing ring, and the packing follower further including an annular, planar, perpendicular wall spanning between the coaxial wall and the first end male threads, the perpendicular wall contacting the second end surface of the packing ring, and the perpendicular wall being sized substantially the same as the body end wall and the first and second end surfaces of the packing ring;

the packing follower further having inner surfaces forming an internal passageway open at the packing follower's first and second ends, with the inner surfaces forming a hexagonal cross-section for engagement with a predetermined hexagonal wrench, with the inner surfaces of the body internal passage way being sized, constructed and arranged to permit application and rotation of the wrench therethrough;

said body first end male threads and packing follower first end male threads being constructed and arranged such that they may be threadedly engaged with the damaged female threads of the equipment opening a selected distance within the equipment opening, whereupon relative rotation between the body and packing follower causes the packing ring to be compressed by the body end wall and packing follower coaxial and perpendicular walls and extruded into sealing engagement with the damaged female threads of the equipment opening.

* * * * *